US012743166B2

(12) United States Patent
Sato et al.

(10) Patent No.: US 12,743,166 B2
(45) Date of Patent: Sep. 22, 2026

(54) KNOB INPUT DEVICE INCLUDING A VIBRATING MEMBER AND A MAGNETIC SENSOR

(71) Applicant: ALPS ALPINE CO., LTD., Tokyo (JP)

(72) Inventors: Shunsuke Sato, Miyagi (JP); Takashi Noguchi, Vastra Frolunda (SE)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 19/288,421

(22) Filed: Aug. 1, 2025

(65) Prior Publication Data

US 2025/0362764 A1 Nov. 27, 2025

Related U.S. Application Data

(63) Continuation of application No. PCT/JP2024/002780, filed on Jan. 30, 2024.

(30) Foreign Application Priority Data

Feb. 8, 2023 (JP) ................................ 2023-017697

(51) Int. Cl.
*G06F 3/0362* (2013.01)

(52) U.S. Cl.
CPC ................................ *G06F 3/0362* (2013.01)

(58) Field of Classification Search
CPC ................................ G06F 3/0362
USPC ................................ 345/156
See application file for complete search history.

(56) References Cited

U.S. PATENT DOCUMENTS

2013/0229339 A1* 9/2013 Takahata ............... G06F 3/0362 345/156
2014/0320406 A1 10/2014 Nishizawa
2017/0021762 A1* 1/2017 Daman .................. B60K 37/00
2019/0025944 A1 1/2019 Konishi et al.
(Continued)

FOREIGN PATENT DOCUMENTS

JP 2012-514832 6/2012
JP 2014-215850 11/2014
(Continued)

OTHER PUBLICATIONS

International Search Report for PCT/JP2024/002780 mailed on Apr. 2, 2024.

*Primary Examiner* — Nathan P Brittingham
(74) *Attorney, Agent, or Firm* — IPUSA, PLLC

(57) ABSTRACT

An input device includes: an operating member configured to allow a user to rotate the operating member; a holding member configured to hold the operating member such that the operating member is allowed to rotate about a virtual rotation axis; a vibrating member configured to vibrate the holding member and transmit vibrations to the operating member via the holding member; a rotation detection member configured to detect a state of rotation of the operating member; and a control part configured to control drive of the vibrating member according to the state of rotation of the operating member. The vibrating member is held by the holding member such that a longitudinal direction of an outer shape of the vibrating member is parallel to the virtual rotation axis.

8 Claims, 6 Drawing Sheets

(56) References Cited

U.S. PATENT DOCUMENTS

2020/0358347 A1* 11/2020 Nakamura ................ B06B 1/04
2021/0057175 A1* 2/2021 Kim ..................... B60K 35/212

FOREIGN PATENT DOCUMENTS

WO 2017/122648 7/2017
WO 2019/163241 8/2019

* cited by examiner

100
Y
Z
X
A
112(110)
112B
111(110)
111A
113(110)
D2
112A
AX
D1
A 130
135B(135)
160
CONTROL CIRCUIT
161
131
131A
132
131B
134
132
133
134
135A(135)
A1
B1
C1
C2
B2
A2

KNOB INPUT DEVICE INCLUDING A VIBRATING MEMBER AND A MAGNETIC SENSOR

CROSS-REFERENCE TO RELATED APPLICATIONS

This application is a continuation application of International Application No. PCT/JP2024/002780, filed on Jan. 30, 2024, and designated the U.S., which is based upon and claims priority to Japanese Patent Application No. 2023-017697, filed on Feb. 8, 2023. The entire contents of these applications are incorporated herein by reference.

BACKGROUND OF THE INVENTION

1. Field of the Invention

The present disclosure relates to an input device.

2. Description of the Related Art

Patent document 1 discloses an operating device that has: an operating member that is rotated and operated by a user; a holding member that holds the operating member such that the operating member can rotate; a vibrating member that allows the holding member to vibrate; a rotation detection member that detects the rotation of the operating member; and a control member that controls the vibrating member in accordance with the rotation of the operating member.

CITATION LIST

Patent Document

[Patent Document 1] International Publication No. WO2019/163241

SUMMARY OF THE INVENTION

According to an embodiment of the present disclosure, an input device has: an operating member configured to allow a user to rotate the operating member; a holding member configured to hold the operating member such that the operating member is allowed to rotate about a virtual rotation axis; a vibrating member configured to vibrate the holding member and transmit vibrations to the operating member via the holding member; a rotation detection member configured to detect a state of rotation of the operating member; and a control part configured to control drive of the vibrating member according to the state of rotation of the operating member. The vibrating member is held by the holding member such that a longitudinal direction of an outer shape of the vibrating member is parallel to the virtual rotation axis.

DETAILED DESCRIPTION OF THE PREFERRED EMBODIMENTS

Figure 1:
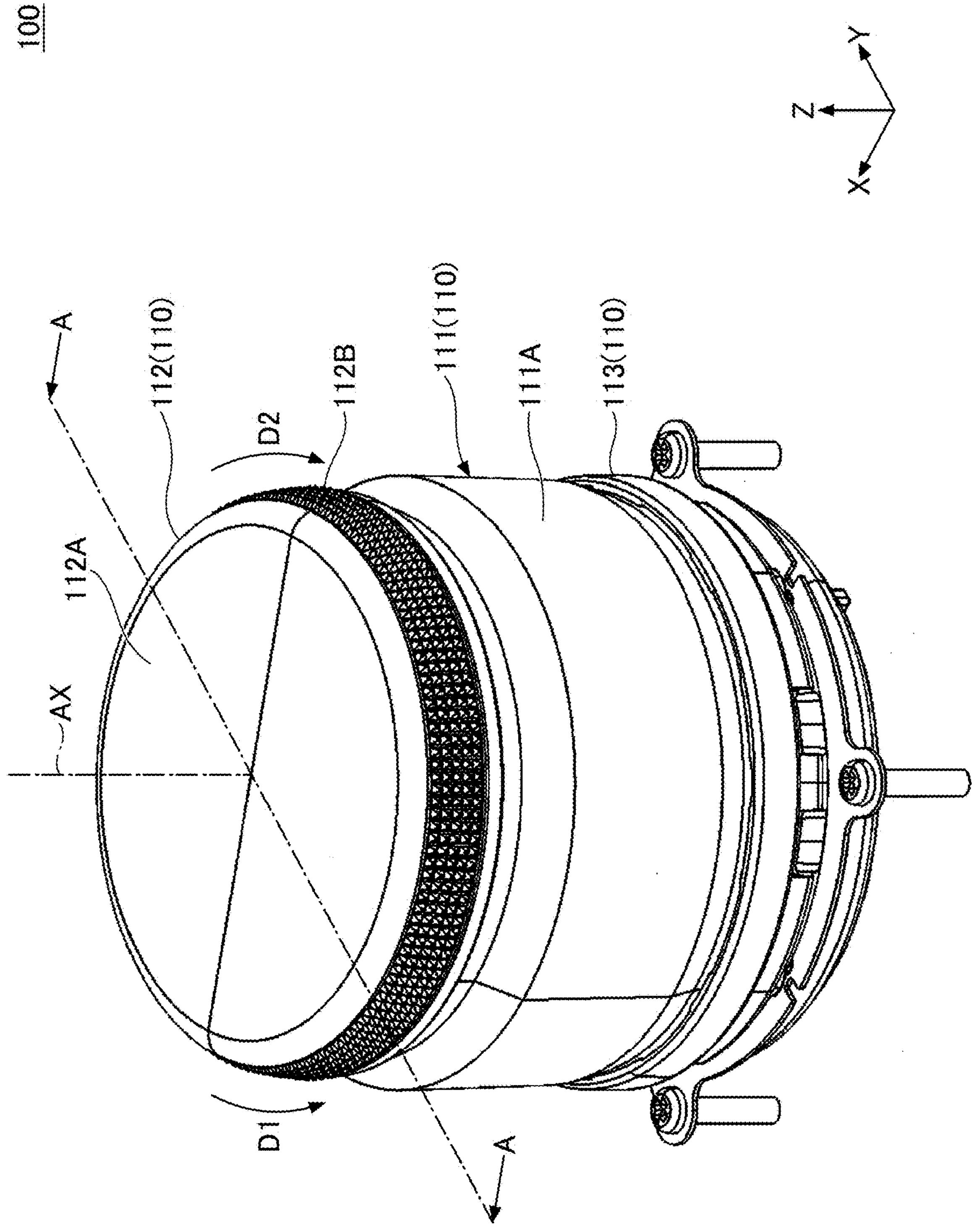
FIG. 1 is an outer perspective view of an input device according to an embodiment of the present disclosure.

In the operating device of patent document 1, the holding member is rectangular in shape when seen in plan view from a virtual rotation axis' axial direction, and the vibrating member is provided below the holding member at a distant position from the operating member. To transmit vibrations to the operating member, it is necessary to make the holding member relatively large in size compared to the operating member when seen in plan view from the axial direction of the virtual rotation axis, and use a large, powerful vibrating member, making it difficult to reduce the overall size of the operating device.

According to the above input device of an embodiment, the overall size of the input device can be made small.

An embodiment of the present disclosure will be described below with reference to the accompanying drawings. Note that the ±X-axis directions in the drawings will be referred to as front and rear directions in the following description. Likewise, the ±Y-axis directions in the drawings will be hereinafter referred to as left and right directions, and the ±Z-axis directions in the drawings will be hereinafter referred to as upward and downward directions. The positive X-axis direction is the front, the positive Y-axis direction is the right, and the positive Z-axis direction is above. These "directions" indicate, for example, where components are positioned relative to one another in a device, and by no means limit the direction in which the device can be installed, the directions in which the device can be operated, and so forth. Any device that houses components positioned similarly relative to each other or of which the direction in which the device can be installed, the directions in which the device can be operated, etc. are different from the embodiment described are all included in the scope of the present disclosure.

(Outline of Input Device 100)

FIG. 1 is an outer perspective view of an input device 100 according to an embodiment of the present disclosure. The input device 100 shown in FIG. 1 is mounted on a vehicle such as an automobile. A user rotates and operates the input device 100 to input commands for electrically controlling various devices and equipment that are provided in the vehicle and subject to control (e.g., audio equipment, car navigation system, air conditioner, electronic shifter, etc.).

As shown in FIG. 1, the input device 100 has a member 110, which has a substantially cylindrical outer shape and which rotates when operated by the user (hereinafter referred to as "operating member 110"). The operating member 110 has a rotor 111, a knob 112, and a cover member 113.

The rotor 111 is a substantially cylindrical member having its center on a virtual rotation axis AX. The rotor 111 has a substantially cylindrical outer wall part 111A formed to extend in the axial direction (i.e., the positive and negative Z-axis directions) of the virtual rotation axis AX.

The knob 112 is a lid-like member that is circular in shape when seen in plan view from the axial direction (i.e., either the positive or negative Z-axis direction) of the virtual rotation axis AX. The knob 112 is fixed to an upper part of the rotor 111 by a snap-fit mechanism or the like (details not shown). As a result of this, the knob 112 and the rotor 111 rotate together. The knob 112 has: a planar part 112A that is circular in shape when seen in plan view; and an outer side surface part 112B that is annular in shape along the outer edge part of the planar part 112A, and that extends downward (in the negative Z-axis direction) from the outer edge part of the planar part 112A. The user holds the outer side surface part 112B when rotating and operating the operating member 110.

The cover member 113 is a lid-like member with a round opening part 113A formed in its center in plan view from the axial direction (i.e., either the positive or negative Z-axis direction) of the virtual rotation axis AX. The cover member 113 is fixed to a lower part of the rotor 111 by a snap-fit mechanism or the like (details not shown). As a result of this, the cover member 113 closes part of the outer circumferential part of the lower (negative Z) opening part of the rotor 111 and rotates together with the rotor 111.

When the user rotates and operates the operating member 110, the operating member 110 can rotate both counterclockwise (in the direction labeled "D1" by an arrow in FIG. 1) and clockwise (in the direction labeled "D2" by an arrow in FIG. 1) about the virtual rotation axis AX when seen in plan view from above (from the positive Z-axis direction).

Assuming that the user is holding the outer side surface part 112B of the knob 112 and he/she rotates and operates the operating member 110 and inputs a controlling command, a detection signal that matches the direction in which the operating member 110 is operated and the angle of rotation is sent to the outside, thereby electrically controlling various devices and equipment that are subject to control.

Figure 2:
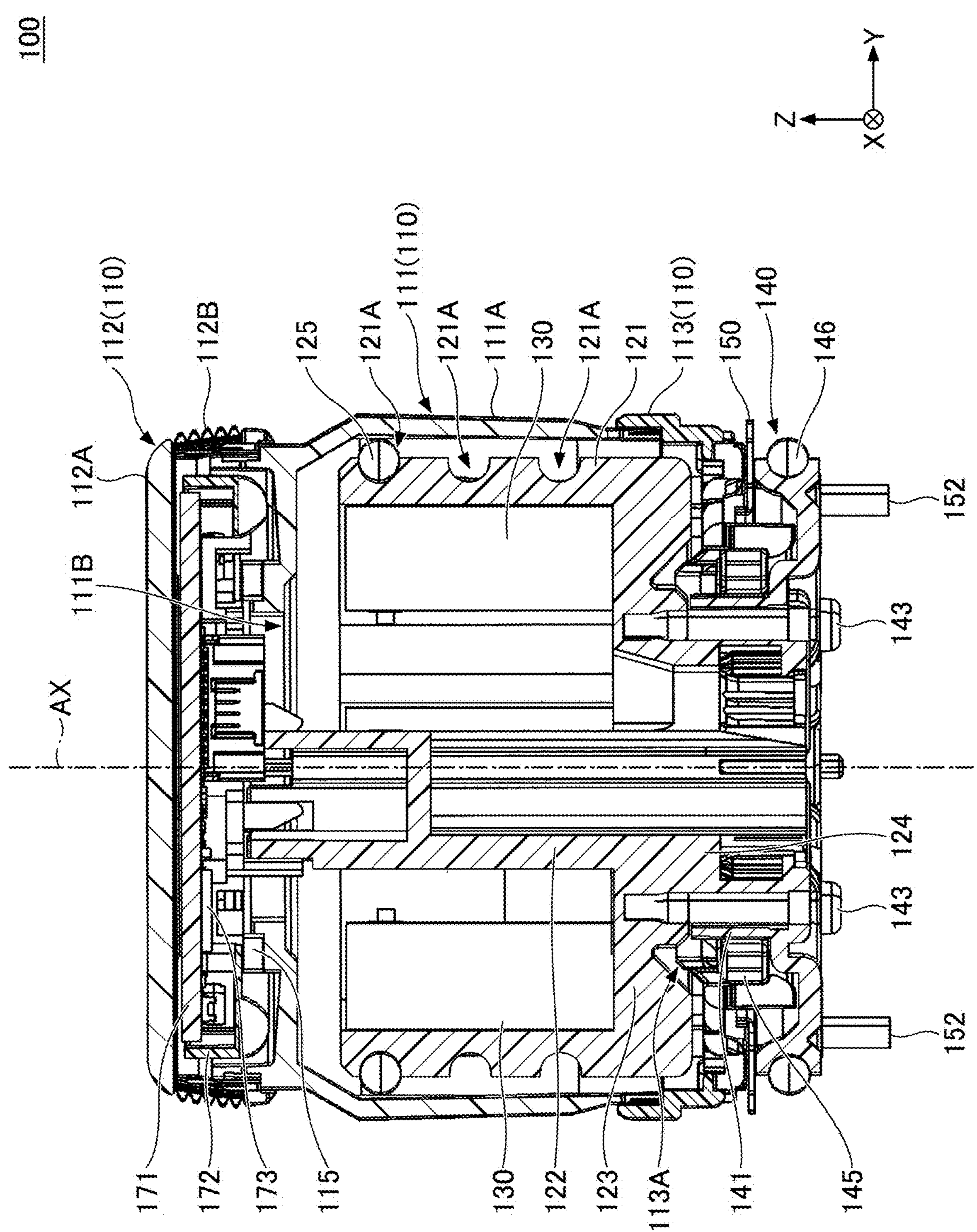
FIG. 2 is a cross-sectional view of an input device according to an embodiment of the present disclosure, taken along the line A-A in FIG. 1.
Figure 3:
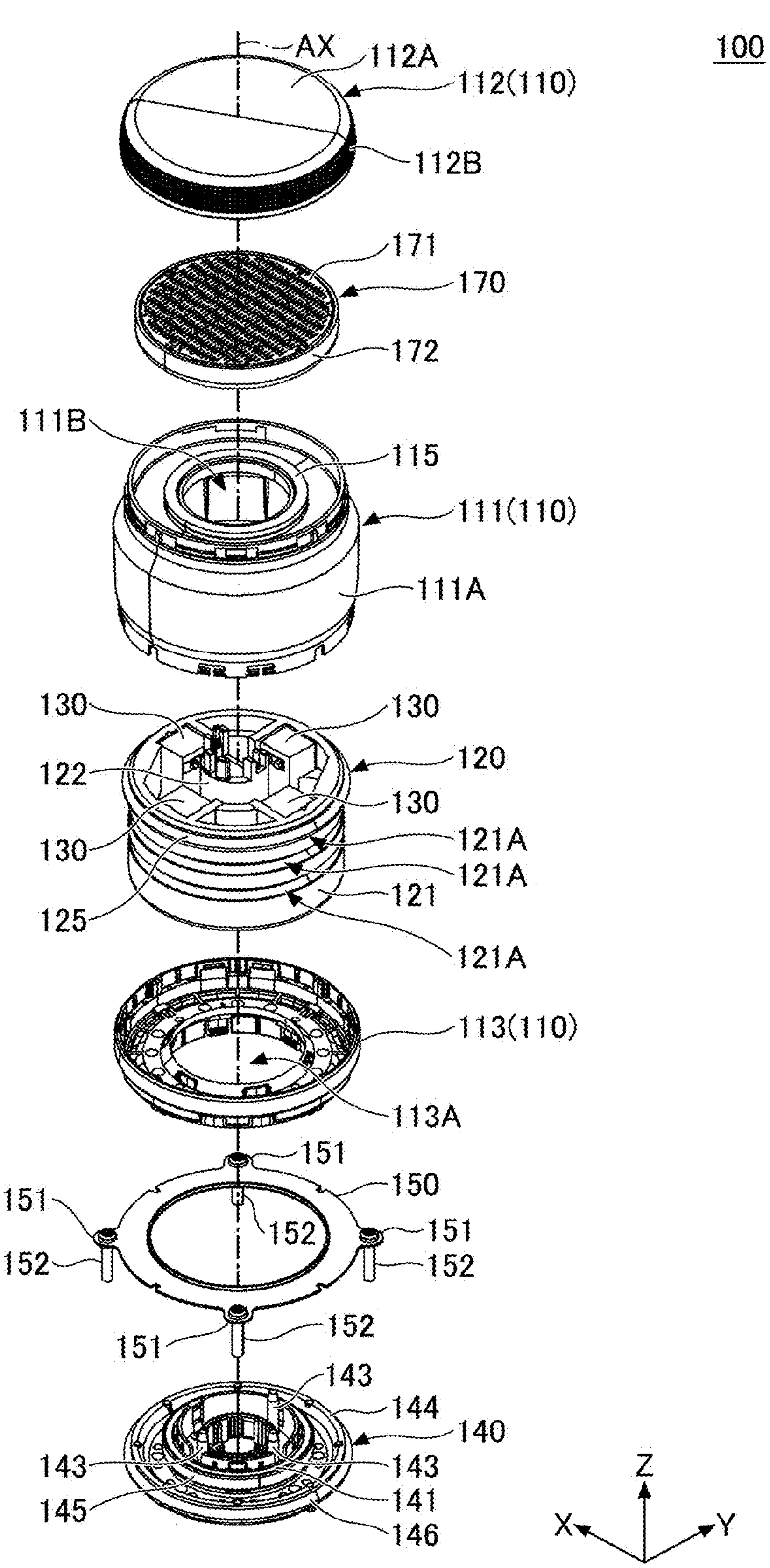
FIG. 3 is an exploded perspective view of an input device according to an embodiment of the present disclosure.

The input device 100 also has four vibrating members 130 inside (see FIG. 2 and FIG. 3). When the operating member 110 is rotated and operated, at least one of the four vibrating members 130 vibrates, causing the operating member 110 to vibrate, and allowing the user to experience a tactile sensation when rotating and operating the operating member 110.

Note that the input device 100 may be mounted on any device or equipment other than a vehicle (for example, a game machine, an airplane, a train car, a remote control, etc.). Also, although the input device 100 has an electrical mechanism for outputting electrical signals in response to rotating operations of the input device 100, the following description of an embodiment will not illustrate or describe this electrical mechanism.

(Structure of Input Device 100)

The structure of the input device 100 will be described in greater detail with reference to FIG. 2 and FIG. 3. FIG. 2 is a cross-sectional view of the input device 100 according to an embodiment of the present disclosure, taken along the cross-sectional line A-A in FIG. 1. FIG. 3 is an exploded perspective view of the input device 100 according to the embodiment.

As shown in FIG. 2 and FIG. 3, the input device 100 has an operating member 110, a holding member 120, four vibrating members 130, a support member 140, a fixing member 150, and an operation detection part 170.

The operating member 110 includes a magnet 115, in addition to the rotor 111, the knob 112, and the cover member 113 described above.

The magnet 115 is positioned on an upper surface of the rotor 111, below a circuit board 171. The magnet 115 has an annular shape that matches a round opening part 111B formed on the upper surface of the rotor 111. The magnet 115 has a multi-polarity structure, in which N and polarities are positioned alternately along the circumference of the magnet 115.

The holding member 120 holds the vibrating member 130 (described later) inside, and is fixed to a predetermined installation location for the device to be controlled such that the holding member 120 itself does not rotate but holds the operating member 110 such that the operating member 110 can rotate. The holding member 120 is a resin cylindrical member that extends upward and downward (in Z-axis directions). The holding member 120 has: a cylindrical outer wall part 121 that extends upward and downward (in Z-axis directions); a semi-cylindrical shaft part 122 that extends upward and downward (in Z-axis directions) inward of the outer wall part 121, at the center of (i.e., on the virtual rotation axis AX of) the holding member 120, and that protrudes upward beyond and downward below the outer wall part 121; and a bottom plate part 123 that closes the lower (negative Z) opening part of the outer wall part 121.

The holding member 120 is fixed and positioned inside the rotor 111 of the operating member 110, and holds the operating member 110 such that the holding member 120 does not rotate together with the operating member 110 but the operating member 110 is able to rotate about the virtual rotation axis AX. The holding member 120 also has a substantially cylindrical bearing part 124 that protrudes downward (in the negative Z-axis direction) from a bottom surface of the bottom plate part 123. The bearing part 124 engages with a shaft part 141 (described later) of the support member 140, and thereupon the holding member 120 is supported by the support member 140.

Furthermore, provided that the shaft part 122 is semi-cylindrical in shape, the upper end part of the shaft part 122 passes through the opening part 111B formed in an upper surface of the rotor 111, and engages with a bottom surface of the holder 172 of the operation detection part 170. By this means, the upper end part of the shaft part 122 can function as a rotation stopper, and the holding member 120 can support the operation detection part 170 such that the operation detection part 170 does not rotate.

Also, groove parts 121A are formed in the outer surface of the outer wall part 121. The groove parts 121A are recessed radially inward, and, formed in an annular shape, extend circumferentially. An annular elastic member 125 made of an elastic material (e.g., silicone rubber) is fit in each groove part 121A. The elastic member 125 contacts both the outer surface of the outer wall part 121 of the holding member 120 and the inner surface of the rotor 111 of the operating member 110, and is slightly compressed by both. As a result of this, the elastic member 125 gives an anti-rotation force that works against the rotating operation of the operating member 110, allowing the vibrations of the vibrating member 130 held inside the holding member 120 to transmit to the operating member 110 easily. Looking at the radial directions, the elastic member 125 is slightly thicker than the gap between the outer surface of the outer wall part 121 and the inner surface of the rotor 111.

Note that, with the present embodiment, three groove parts 121A are formed in different positions in the outer surface of the outer wall part 121 in the up-down direction (in Z-axis directions). The elastic member 125 is fit only in the uppermost groove part 121A (in the positive Z-axis direction).

However, the present disclosure is by no means limited to this, and the elastic member 125 may be fit in any of the three groove parts 121A, or the elastic member 125 may be fit in more than one groove part 121A among the three groove parts 121A. This can increase the anti-rotation force that works when the operating member 110 is operated and rotates, allowing the vibrations of the vibrating member 130 to transmit to the operating member 110 more easily. Also, two or fewer groove parts 121A, or four or more groove parts 121A, may be formed in the outer surface of the outer wall part 121.

The four vibrating members 130 are all positioned inside the holding member 120 (to be more specific, in the space between the outer wall part 121 and the shaft part 122). The four vibrating members 130 are all fixed to the inner-wall surface of the outer wall part 121 using a double-sided tape, an adhesive, etc.

In the present embodiment, the four vibrating members 130 are positioned at equal intervals (i.e., at 90-degree intervals) on the circumference of a virtual circle centered on the virtual rotation axis AX inside the holding member 120. In particular, in the present embodiment, the four vibrating members 130 are positioned in front, back, left, and right of the virtual rotation axis AX. These four positions are on the positive X side, the negative X side, the positive Y side, and the negative Y side, respectively, relative to the virtual rotation axis AX.

The four vibrating members 130 all have an outer shape that is substantially a rectangular parallelepiped. That is, the outer shape of the vibrating member 130 has dimensions in (positive and negative) longitudinal directions, first (positive and negative) transverse directions that are perpendicular to the longitudinal directions, and second (positive and negative) transverse directions that are perpendicular to the longitudinal directions and the first transverse directions.

Figure 4:
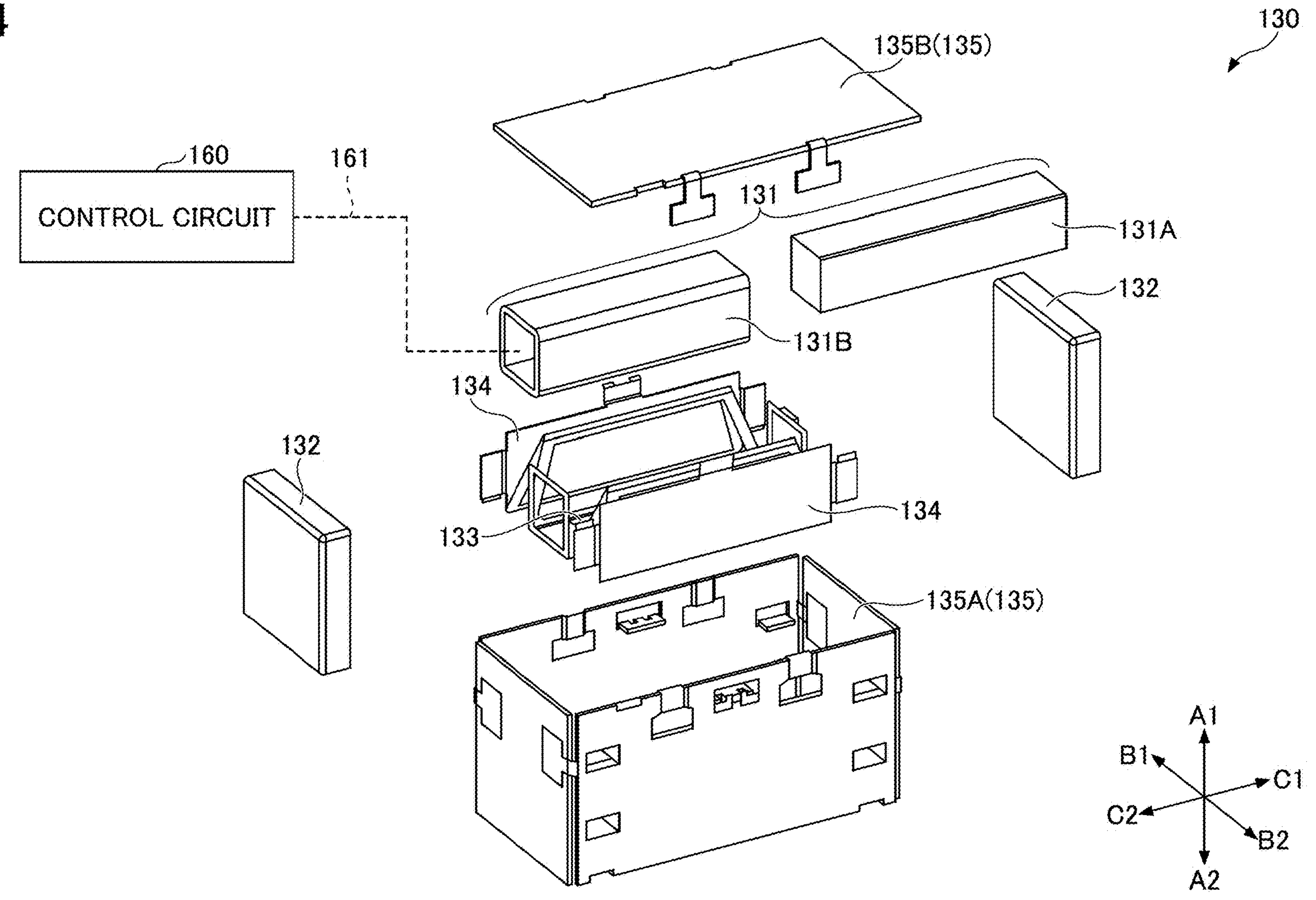
FIG. 4 is an exploded perspective view showing an example structure of a vibrating member according to an embodiment of the present disclosure.

Also, the four vibrating members 130 are configured to resonate in the first transverse directions in the outer shape of the vibrating member 130 and the second transverse directions in the outer shape of the vibrating member 130, by drive control from the control circuit 160 based on two different frequencies (see FIG. 4). As a result of this, the four vibrating members 130 can all vibrate the holding member 120 and transmit t the vibrations to the operating member 110 via the holding member 120.

According to the present embodiment, the four vibrating members 130 are positioned inside the holding member 120 such that the longitudinal directions in the outer shape of each vibrating member 130 match upward and down directions (in Z-axis directions), making the four vibrating members 130 parallel to the virtual rotation axis AX. Also, the four vibrating members 130 are all positioned inside the holding member 120 such that the first transverse directions in the outer shape of the vibrating member 130 match X-axis directions, and the second transverse directions in the outer shape of the vibrating member 130 match Y-axis directions. Thus, the four vibrating members 130 are all positioned to vibrate in X-axis directions and in Y-axis directions.

Note that, although the input device 100 of the present embodiment has four vibrating members 130, the present embodiment is by no means limited to this, and the input device 100 may have three or fewer, or five or more vibrating members 130.

Although the four vibrating members 130 of the present embodiment all share the same specifications and the same resonant frequency, the present embodiment is by no means limited to this, and four vibrating members 130 with different specifications, such as four vibrating members 130 with different resonant frequencies, etc. may be used.

Also, although the four vibrating members 130 of the present embodiment all resonate in two different directions by drive control based on two different resonant frequencies, the present embodiment is by no means limited to this, and it is equally possible to use a vibrating part (e.g., linear resonant actuator (LRA)) that has only one resonant frequency and resonates only in one direction.

The support member 140 is a resin, substantially disk-like member provided below (on the negative Z side of) the cover member 113 of the operating member 110. The support member 140 supports the holding member 120 by fixing the bottom surface of the holding member 120 that is housed inside the rotor 111. The support member 140 has a cylindrical shaft part 141 that protrudes upward (in the positive Z-axis direction), at the center of the support member 140. The shaft part 141 passes through the opening part 113A of the cover member 113, and, given that the holding member 120 is housed inside the rotor 111, the upper end part of the shaft part 141 engages with the bearing part 124, which protrudes downward from the bottom plate part 123 of the holding member 120.

Then, with the upper end part of the shaft part 141 and the bearing part 124 of the holding member 120 fit together, the support member 140 is fixed to the bottom surface of the holding member 120 with a number of (three in the present embodiment) fixing screws 143 that penetrate the support member 140 from bottom (the negative Z-axis direction) to top (the positive Z-axis direction). As a result of this, the support member 140 supports the holding member 120 housed inside the rotor 111 such that the holding member 120 does not rotate.

Also, an annular bearing 145 is attached to the outer surface of the shaft part 122. The bearing 145 fits in the opening part 113A of the cover member 113 of the operating member 110, thereby allowing the operating member 110 to rotate smoothly.

Also, an elastic member 146 that is annular in shape and made of an elastic material (e.g., silicone, rubber, etc.) is fit in the outer surface of the support member 140. The elastic member 146 is positioned in the gap between the outer surface of the support member 140 and the inner surface of the opening part (i.e., the opening part in which the support member 140 is fit) formed at a predetermined location where the input device 100 is installed. Consequently, for example, the elastic member 146 can absorb the vibrations of the input device 100 and impede transmission of the vibrations of the input device 100 to the predetermined installation location. Furthermore, when the operating member 110 is operated and slides horizontally, the elastic member 146 allows very small movement of the operating member 110 and, after the sliding operation of the operating member 110 is done, brings the operating member 110 back to its original position.

The fixing member 150 is a metallic member shaped like a circular frame, provided so that the input device 100 can be fixed to a predetermined installation location. The fixing member 150 is fixed to the input device 100 by being clamped between the annular outer circumferential part 144 of the support member 140 and the bottom surface of the cover member 113 of the operating member 110. In the fixing member 150, four fixing parts 151 are provided at 90-degree intervals. The four fixing parts 151 protrude radially outward from the outer edge part of the fixing member 150. The fixing member 150 is fixed to a predetermined installation location with four fixing screws 152 that penetrate the four fixing parts 151 from above (the positive Z-axis direction) to below (the negative Z-axis direction), thereby fixing the input device 100 to a predetermined installation location.

Having a substantially disk-like outer shape, the operation detection part 170 is positioned above the upper surface of the rotor 111 and below the planar part 112A of the knob 112 (that is, in the space surrounded by the outer side surface part 112B). The operation detection part 170 has a resin disk-like circuit board 171 and a resin saucer-like holder 172 that holds the circuit board 171. The bottom surface of the holder 172 is fixed to the upper end part of the shaft part 122 of the holding member 120, so that the operation detection part 170 is supported by the holding member 120 such that the operation detection part 170 does not rotate. The operation detection part 170 can detect the user's approach to the knob 112, the user's contact/operation with the knob 112 (for example, gripping, input of letters, etc.), etc., by means of multiple electrostatic detection electrodes mounted on the upper surface of the circuit board 171.

A magnetic sensor 173 is provided below the circuit board 171, above the magnet 115, such that the magnetic sensor 173 faces a part of the magnet 115. The magnetic sensor 173 is an example of a "rotation detection member" for detecting the state of rotation of the operating member 110. When the operating member 110 is operated and rotated, the magnet 115 and the rotor 111 rotate together, and thereupon the magnetic sensor 173, which is fixed in place and does not rotate, detects a change in the magnetic field. This allows the magnetic sensor 173 to detect the state of rotation (the direction and angle of rotation) of the operating member 110.

(Operation of Input Device 100)

When the user holds the outer side surface part 112B of the knob 112 and rotates and operates the operating member 110 of the input device 100, the operating member 110 rotates counterclockwise (in the direction of the arrow labeled "D1" in FIG. 1) or clockwise (in the direction of the arrow labeled "D2" in FIG. 2).

When this takes place, the magnetic sensor 173, which is provided under the circuit board 171 and which is fixed not to rotate, detects a change in the magnetic field produced by the magnet 115 that rotates with the operating member 110, thereby detecting the state of rotation (the direction and angle of rotation) of the operating member 110. Then, the magnetic sensor 173 sends a detection signal that matches the detected state of rotation, to the outside, so that the input device 100 can control, electrically, various devices and equipment that are subject to control.

Also, the magnetic sensor 173 sends a detection signal matching the detected state of rotation to the control circuit 160 (see FIG. 4). The control circuit 160 then controls at least one of the four vibrating members 130 based on the state of rotation detected, thereby allowing, via the holding member 120, the operating member 110 to vibrate in predetermined directions, and allowing the user to experience a tactile sensation when rotating and operating the operating member 110.

For example, assuming that a first predetermined state of rotation is detected, the control circuit 160 makes the four vibrating members 130 vibrate in X-axis directions all at the same time, thereby allowing, via the holding member 120, the operating member 110 to vibrate in X-axis directions, and allowing the user to experience a tactile sensation when rotating and operating the operating member 110.

Also, in the event a second predetermined state of rotation is detected, the control circuit 160 makes the four vibrating members 130 vibrate in Y-axis directions all at the same time, thereby allowing, via the holding member 120, the operating member 110 to vibrate in Y-axis directions, and allowing the user to experience a tactile sensation when rotating and operating the operating member 110. Note that, even if the number of vibrating members 130 is three or less, or five or more, these vibrating members 130 may be configured to vibrate in the same direction all at the same time.

Here, in the input device 100 of the embodiment, the vibrating member 130 has substantially a rectangular parallelepiped outer shape and is held by the holding member 120 such that the longitudinal directions of the outer shape are parallel to the virtual rotation axis AX.

The input device 100 of the embodiment therefore has only to secure, in the holding member 120, a space that is greater than or equal to the minimum area of the outer shape of the vibrating member 130 (i.e., the cross-sectional area perpendicular to the longitudinal directions) in plan view from the axial direction of the virtual rotation axis AX. The input device 100 of the embodiment can thus prevent or substantially prevent the holding member 120 from becoming large in size in plan view from the axial direction of the virtual rotation axis AX, so that the overall size of the input device 100 can be made small.

In particular, in the input device 100 of the embodiment, the vibrating member 130 overlaps the operating member 110 in plan view from the axial direction of the virtual rotation axis AX. That is, in plan view from the axial direction of the virtual rotation axis AX, the vibrating member 130 is provided to fit within the outer shape (which is circular in the present embodiment) of the operating member 110.

As a result of this, the input device 100 of the embodiment can prevent or substantially prevent the holding member 120 from becoming large in size in plan view from the axial direction of the virtual rotation axis AX, so that the overall size of the input device 100 can be made small.

Also, in the input device 100 of the embodiment, the outer wall part 111A of the operating member 110 extends in the axial direction of the virtual rotation axis AX, and the vibrating member 130 is surrounded by the outer wall part 111A of the operating member 110.

By this means, the input device 100 of the embodiment can transmit the vibrations of the vibrating member 130 to the operating member 110 easily.

Furthermore, the input device 100 of the embodiment has multiple vibrating members 130.

As a result of this, the input device 100 of the embodiment can transmit stronger vibrations to the operating member 110 by making all the vibrating members 130 vibrate at the same time. Also, by allowing all the vibrating members 130 to vibrate in the same direction (for example, in Y-axis directions) at the same time, even stronger vibrations can be transmitted.

Also, in the input device 100 of the embodiment, the elastic member 125 contacts both the holding member 120 and the operating member 110.

As a result of this, the input device 100 of the embodiment can produce an anti-rotation force when the user rotates and operates the operating member 110, thereby facilitating transmission of the vibrations produced by the vibrating member 130 to the operating member 110.

(Example Structure of Vibrating Member 130)

FIG. 4 is an exploded perspective view showing an example structure of the vibrating member 130 according to the embodiment. As shown in FIG. 4, the vibrating member 130 has a casing 135, a vibrator 131, a pair of magnets 132, a holding part 133, and a pair of elastic supports 134.

Note that, in FIG. 4, the directions labeled "C1" and "C2" are both "longitudinal directions" of the outer shape of the vibrating member 130. Also, in FIG. 4, the directions labeled "A1" and "A2" are both "first transverse directions" of the outer shape of the vibrating member 130 (that is, directions perpendicular to the longitudinal directions of the vibrating member 130). Furthermore, in FIG. 4, the directions labeled "B1" and "B2" are both "second transverse directions" of the outer shape of the vibrating (that is, directions perpendicular to the member 130 longitudinal directions and the first transverse directions of the vibrating member 130).

The casing 135 is a metal box-like member (substantially a rectangular parallelepiped in shape). The casing 135 houses individual components inside (the vibrator 131, a pair of magnets 132, the holding part 133, and a pair of elastic supports 134). In the example shown in FIG. 4, the casing 135 is composed of a box-like (substantially a rectangular parallelepiped in shape) body part 135A with an upper opening, and a flat lid part 135B that closes the upper opening of the body part 135A.

The vibrator 131 has a core 131A and a coil 131B. The core 131A is made of a ferromagnetic material. The core 131A is a rectangular columnar member that extends in directions (i.e., in the directions labeled "C1" and "C2") that are parallel to the longitudinal directions of the vibrating member 130. The coil 131B is a rectangular cylindrical member formed by winding a wire around the outer surface of the core 131A. The vibrator 131 functions as an electromagnet that produces a magnetic field when a current flows in the coil 131B.

Note that, as shown in FIG. 4, the coil 131B is connected with the control circuit 160 of the input device 100 via a non-specific wire member 161 (e.g., flexible printed circuit (FPC)). This allows the current flow in the coil 131B to be controlled by the control circuit 160.

A pair of magnets 132 are both positioned outward of the vibrator 131 in the longitudinal (C1 and C2) directions of the vibrating member 130, sandwiching the vibrator 131 between them. That is, the pair of magnets 132 are arranged to face, respectively, the two longitudinal (C1 and C2) end parts of the vibrator 131.

The holding part 133 is a metal member that holds the vibrator 131. In the example shown in FIG. 4, the holding part 133 has a horizontal planar part that supports the bottom surface of the vibrator 131.

A pair of elastic supports 134 are both positioned outward of the vibrator 131 in the second transverse (B1 and B2) directions in the outer shape of the vibrating member 130, sandwiching the vibrator 131 between them. The elastic supports 134 are both shaped such that multiple metallic plates are folded and multi-layered in the second transverse (B1 and B2) directions in the outer shape of the vibrating member 130. This makes both of the elastic supports 134 capable of elastic deformation. For example, the pair of elastic supports 134 can flex in the first transverse (A1 and A2) directions in the outer shape of the vibrating member 130, and expand and contract in the second transverse (B1 and B2) directions in the outer shape of the vibrating member 130.

Structured to be flexible as described above, the pair of elastic supports 134 each have: a first elastic modulus for elastic deformation in the first transverse (A1 and A2) directions in the outer shape of the vibrating member 130; and a second elastic modulus for elastic deformation in the second transverse (B1 and B2) directions in the outer shape of the vibrating member 130. The first elastic modulus and the second elastic modulus are different from each other. This allows the vibrating member 130 to have different resonant frequencies in different directions.

Looking at each individual elastic support 134, its outermost end part in the second transverse (B1 and B2) directions in the outer shape of the vibrating member 130 is fixed to the casing 135, while the innermost end part in the second transverse (B1 and B2) directions in the outer shape of the vibrating member 130 is fixed to the holding part 133. In particular, with the present embodiment, each elastic support 134 is made from a single metallic plate, and the holding part 133, positioned between the pair of elastic supports 134, is joined together with both elastic supports 134.

As a result of this, with the vibrating member 130 of this embodiment, a pair of elastic supports 134 are deformed elastically inside the casing 135, thereby driving the vibrator 131 held by the holding part 133 at different frequencies and making the vibrator 131 vibrate in the first transverse (A1 and A2) directions in the outer shape of the vibrating member 130 and in the second transverse (B1 and B2) directions in the outer shape of the vibrating member 130.

(Example Operation of Vibrating Member 130)

Figure 5A:
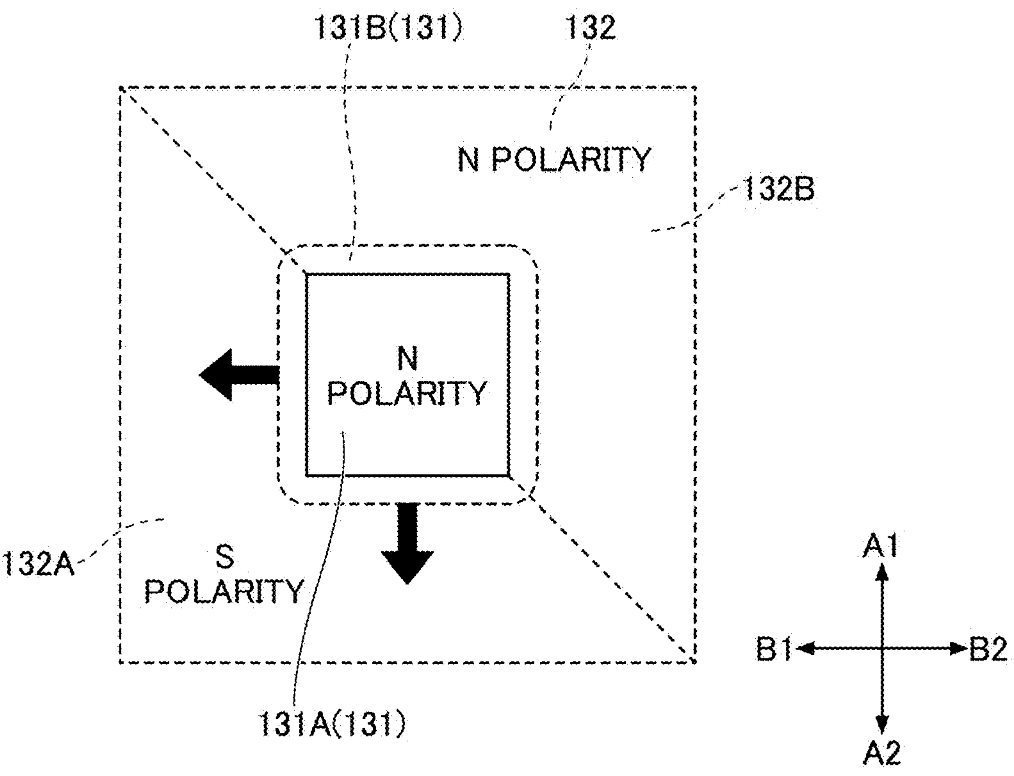
FIG. 5A is an explanatory view showing directions in which a vibrator provided in a vibrating member according to an embodiment of the present disclosure is driven.
Figure 5B:
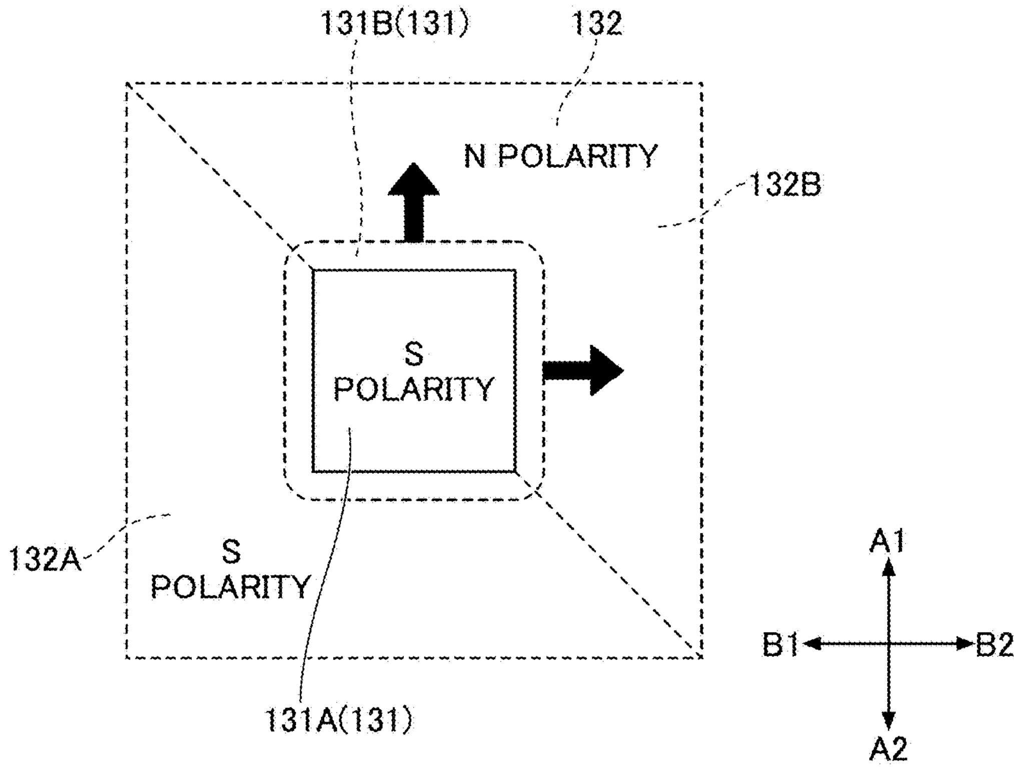
FIG. 5B is an explanatory view showing directions in which a vibrator provided in a vibrating member according to an embodiment of the present disclosure is driven.
Figure 6A:
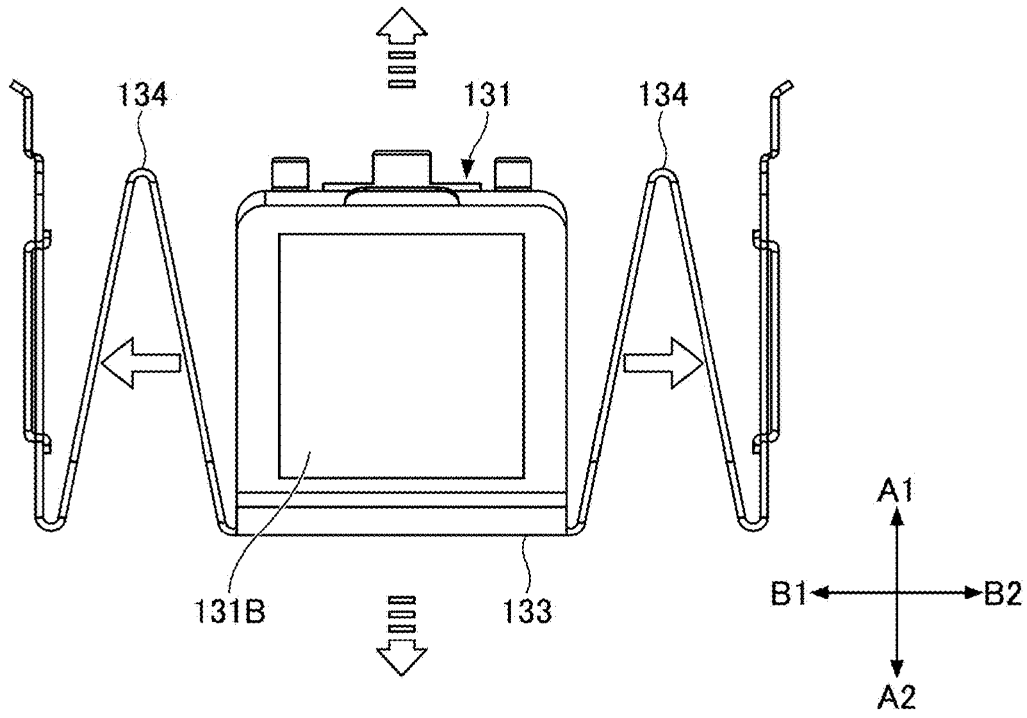
FIG. 6A is an explanatory view showing directions in which a vibrator provided in a vibrating member according to an embodiment of the present disclosure vibrates.
Figure 6B:
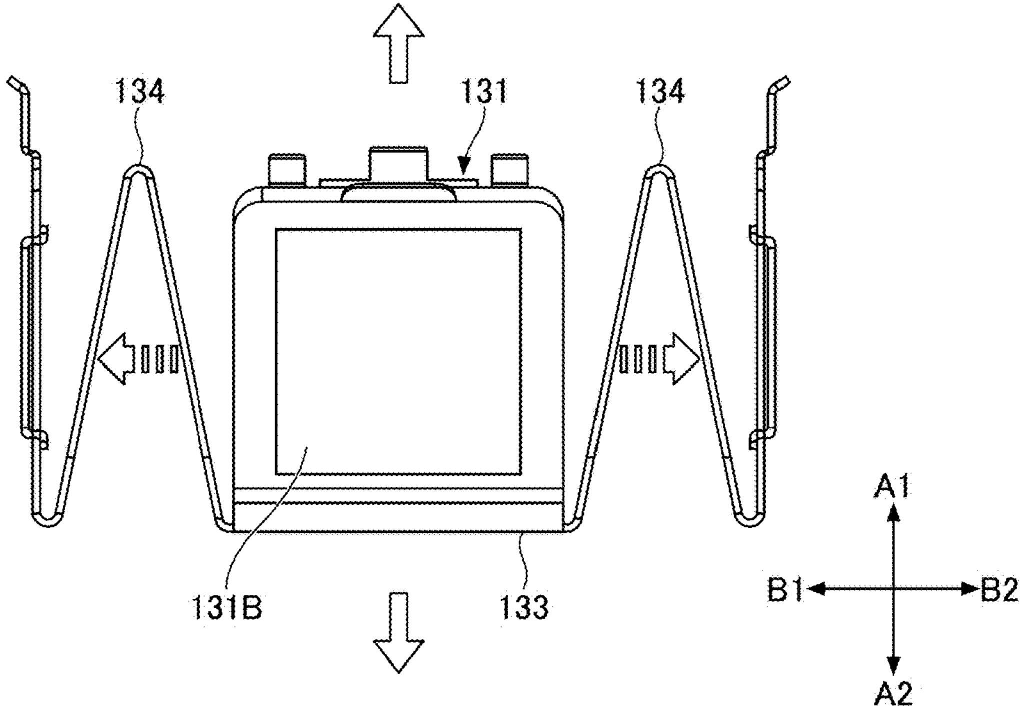
FIG. 6B is an explanatory view showing directions in which a vibrator provided in a vibrating member according to an embodiment of the present disclosure vibrates.

FIGS. 5A and 5B are diagrams for explaining the directions in which a magnetic drive part provided in the vibrating member 130 of the embodiment is driven. FIGS. 6A and 6B are diagrams for explaining the directions in which the vibrator provided in the vibrating member 130 of the embodiment vibrates.

As described earlier, the vibrating member 130 has a vibrator 131 and a pair of magnets 132 that are positioned on both sides of the casing 135. The vibrating body 131 produces an alternating magnetic field when an alternating current flows in the coil 131B, magnetizing one end part and the other end part of the core 131A.

FIGS. 5A and 5B show, for example, one end part of the core 131A, and the magnet 132 facing that end part of the core 131A. Referring to FIGS. 5A and 5B, a diagonal of the rectangle formed on the surface of the magnet 132 facing one end part of the core 131A divides this surface into a first magnetized part 132A and a second magnetized part 132B. The first magnetized part 132A and the second magnetized part 132B of the magnet 132 are magnetized to S and N polarities, respectively.

As shown in FIG. 5A, assuming that one end part of the core 131A is magnetized to N polarity, this "N" end part of the core 131A and the first magnetized part 132A of the magnet 132 facing the "N" end part of the core 131A are attracted to each other, while the "N" end part of the core 131A and the second magnetized part 132B of the magnet 132 facing the "N" end part of the core 131A repel each other. Although not shown in the figure, in the event the other end part of the core 131A is magnetized to S polarity, likewise, this "S" end part of the core 131A and the first magnetized part 132A of the magnet 132 facing the "S" end part of the core 131A are attracted to each other, while the "S" end part of the core 131A and the second magnetized part 132B of the magnet 132 facing the "S" end part of the core 131A repel each other. As a result of this, as shown in FIG. 5A, a magnetic force acts on the vibrator 131 in the left (B1) and downward (A2) directions in FIG. 5A.

Similarly, referring to FIG. 5B, in the event one end part of the core 131A is magnetized to S polarity, this "S" end part of the core 131A and the second magnetized part 132B of the magnet 132 facing the "S" end part of the core 131A are attracted to each other, while the "S" end part of the core 131A and the first magnetized part 132A of the magnet 132 facing the "S" end part of the core 131A repel each other. Although not shown in the figure, in the event the other end part of the core 131A is magnetized to N polarity, likewise, this "N" end part of the core 131A and the second magnetized part 132B of the magnet 132 facing the "N" end part of the core 131A are attracted to each other, while the "N" end part of the core 131A and the first magnetized part 132A of the magnet 132 facing the "N" end part of the core 131A repel each other. As a result of this, as shown in FIG. 5B, a magnetic force acts on the vibrator 131 in the right (B2) and upward (A1) directions in FIG. 5B.

The control circuit 160 is an example of a "control part" for controlling the drive of the vibrating member 130 according to the state of rotation of the operating member 110. The control circuit 160 can apply an AC current to the coil 131B, so that one end part of the core 131A can be magnetized to N polarity and to S polarity, by turns, and the other end part of the core 131A can also be magnetized to S polarity and to N polarity by turns. As a result of this, the magnetic forces shown in FIG. 5A and the magnetic forces shown in FIG. 5B act on the vibrator 131 by turns. Furthermore, referring to FIGS. 6A and 6B, by making a pair of elastic supports 134 that support the vibrator 131 deform elastically, the vibrator 131 can vibrate in the upward and downward (A1 and A2) directions and in the left and right (B1 and B2) directions shown in FIG. 5.

The control circuit 160 can apply, to the coil 131B, an alternating current having a frequency that is the same as a second natural frequency of the vibrator 131, so that, as shown in FIG. 6A, an alternating magnetic field having the same frequency as the second natural frequency can be produced in the vibrator 131, and the vibrator 131 can resonate extensively in the left and right (B1 and B2) directions shown in FIGS. 6A and 6B.

Meanwhile, to the coil 131B, the control circuit 160 can apply an AC current having a frequency that is the same as a first natural frequency of the vibrator 131, so that, as shown in FIG. 6B, an alternating magnetic field having the same frequency as the first natural frequency can be produced in the vibrator 131, and the vibrator 131 can resonate extensively in the left and right (A1 and A2) directions shown in FIGS. 6A and 6B. Consequently, it is possible to produce an AC current having the first natural frequency, or produce first natural vibrations, and allow the vibrator 131 to vibrate in the A1 and A2 directions or in the B1 and B2 directions in a selective manner.

Note that the first natural frequency of the vibrator 131 is determined by the first elastic modulus of the elastic support 134 and the mass of the vibrator 131. Also, the second natural frequency of the vibrator 131 is determined by the second elastic modulus of the elastic support 134 and the mass of the vibrator 131.

As described above, with the input device 100 of the embodiment, the vibrating member 130 is a linear resonant actuator (LRA) which has: a pair of magnets 132 positioned at both longitudinal end parts in the outer shape of the vibrating member 130; a vibrator 131 positioned between the pair of magnets 132 and having a coil 131B; and an elastic support 134 supporting the vibrator 131 from directions perpendicular to the longitudinal directions in the outer shape of the vibrating member 130, and in which the vibrator 131 can resonate in directions perpendicular to the longitudinal directions in the outer shape of the vibrating member 130.

Structured thus, the input device 100 of the embodiment can easily control the power with which the vibrating member 130 vibrates, by controlling the frequency of current flow from the control circuit 160 to the coil 131B.

In particular, in the input device 100 according to the above-described embodiment, the vibrating member 130 is a linear resonant actuator (LRA) that has two resonant frequencies, and that allows the vibrator 131 to resonate in first transverse directions in the outer shape of the vibrating member 130 and in second transverse directions in the outer shape of the vibrating member 130, where the first and second transverse directions are perpendicular to the longitudinal directions in the outer shape of the vibrating member 130 and perpendicular to each other.

As a result of this, the input device 100 of the embodiment can easily control the directions in which the vibrating member 130 vibrates, as well as the power with which the vibrating member 130 vibrates, by controlling the frequency of current flow from the control circuit 160 to the coil 131B, thereby enabling the vibrating member 130 to vibrate in a variety of ways.

Although an embodiment of the present disclosure has been described above in detail, the present disclosure is by no means limited to this embodiment, and various modifications and changes are applicable within the scope of the gist of the present disclosure recited in the accompanying claims.

For example, although the operating member 110 in the input device 100 of the above embodiment can be rotated and operated, the operating member 110 may also be configured such that the operating member 110 can be operated to slide in directions (e.g., X-axis directions and Y-axis directions) perpendicular to the virtual rotation axis AX. In this case, the input device 100 may detect the sliding state of the operating member 110 by a non-specific slide detection member, and the control circuit 160 may control the vibrating member 130 to vibrate according to the sliding state of the operating member 110 detected by the slide detection member.

Also, in the input device 100 of the present embodiment, a mechanism in which a coil vibrates, known as a moving coil type LRA, is used for the vibrating member 130; however, the present disclosure is by no means limited to this, and a mechanism in which a magnet vibrates, known as a moving magnet type, may be used as well.

What is claimed is:

1. An input device comprising:

an operating member including a rotor having a cylindrical outer wall and a knob positioned above the rotor, the operating member configured to allow a user to rotate the operating member;

a holding member fixed and positioned inside the rotor, the holding member configured to hold the operating member such that the operating member is allowed to rotate about a virtual rotation axis;

a vibrating member including a casing and a vibrator, including a core and a coil, vibrating in the casing, the vibrating member configured to vibrate the holding member and transmit vibrations to the operating member via the holding member;

a magnetic sensor positioned above the rotor and positioned below the knob, the magnetic sensor configured to detect a state of rotation of the operating member; and a control circuit configured to control drive of the vibrating member according to the state of rotation of the operating member, wherein a length of the casing in the longitudinal direction is longer than lengths of the casing in the two transverse directions perpendicular to the longitudinal direction, and wherein the vibrating member is held by the holding member such that a longitudinal direction of the casing is parallel to the virtual rotation axis.

2. The input device according to claim 1, wherein the vibrating member overlaps the operating member in plan view from an axial direction of the virtual rotation axis.

3. The input device according to claim 2, wherein the cylindrical outer wall that is formed to extend in the axial direction of the virtual rotation axis, and wherein the vibrating member is surrounded by the cylindrical outer wall.

4. The input device according to claim 1, comprising a plurality of said vibrating members.

5. The input device as according to claim 1, wherein the operating member further allows the user to slide the operating member, wherein the input device further comprises a slide detection member configured to detect a sliding state of the operating member, and wherein the control circuit further controls the drive of the vibrating member according to the sliding state of the operating member.

6. The input device according to claim 1, wherein the holding member includes a shaft, which passes through an opening of the rotor, and an outer wall and wherein the vibrating member is positioned in a space between the outer wall and the shaft.

7. An input device comprising:

an operating member including a rotor having a cylindrical outer wall and a knob positioned above the rotor, the operating member configured to allow a user to rotate the operating member;

a holding member fixed and positioned inside the rotor, the holding member configured to hold the operating member such that the operating member is allowed to rotate about a virtual rotation axis;

a vibrating member including a casing and a vibrator, including a core and a coil, vibrating in the casing, the vibrating member configured to vibrate the holding member and transmit vibrations to the operating member via the holding member;

a magnetic sensor positioned above the rotor and positioned below the knob, the magnetic sensor configured to detect a state of rotation of the operating member; and a control circuit configured to control drive of the vibrating member according to the state of rotation of the operating member, wherein the vibrating member is held by the holding member such that a longitudinal direction of an outer shape of the casing is parallel to the virtual rotation axis, wherein the vibrating member includes a pair of elastic supports sandwiching the vibrator between the pair of elastic supports, and a pair of magnets that are positioned, respectively, at both longitudinal ends of the vibrating member, wherein the vibrating member is a linear resonant actuator configured to allow the vibrator to vibrate, wherein the vibrator is positioned between the pair of magnets, wherein the pair of elastic supports the vibrator from a first traverse direction perpendicular to the longitudinal direction, and wherein the linear resonant actuator has at least two resonant frequencies, and is configured to allow the vibrator to resonate in both the first transverse direction and a second transverse direction of the outer shape of the vibrating member, the first transverse direction and the second transverse direction being perpendicular to each other and perpendicular to the longitudinal direction of the outer shape of the vibrating member.

8. An input device comprising:

an operating member including a rotor having a cylindrical outer wall and a knob positioned above the rotor, the operating member configured to allow a user to rotate the operating member;

a holding member fixed and positioned inside the rotor, the holding member configured to hold the operating member such that the operating member is allowed to rotate about a virtual rotation axis;

a vibrating member configured to vibrate the holding member and transmit vibrations to the operating member via the holding member;

a magnetic sensor positioned above the rotor and positioned below the knob, the magnetic sensor configured to detect a state of rotation of the operating member;

a control circuit configured to control drive of the vibrating member according to the state of rotation of the operating member, and an annular elastic member configured to:

be in contact with both the holding member and the operating member;

produce an anti-rotation force when the user rotates the operating member; and transmit the vibrations of the vibrating member to the operating member, wherein the vibrating member is held by the holding member such that a longitudinal direction of an outer shape of the casing is parallel to the virtual rotation axis.

* * * * *